United States Patent
Hirota et al.

(10) Patent No.: US 12,441,623 B2
(45) Date of Patent: Oct. 14, 2025

(54) ZIRCONIUM OXIDE NANOPARTICLES, DISPERSION LIQUID AND RESIN COMPOSITION

(71) Applicant: NIPPON SHOKUBAI CO., LTD., Osaka (JP)

(72) Inventors: Koichi Hirota, Osaka (JP); Junya Kimura, Osaka (JP)

(73) Assignee: NIPPON SHOKUBAI CO., LTD., Osaka (JP)

( * ) Notice: Subject to any disclaimer, the term of this patent is extended or adjusted under 35 U.S.C. 154(b) by 874 days.

(21) Appl. No.: 17/610,320

(22) PCT Filed: May 15, 2020

(86) PCT No.: PCT/JP2020/019433
§ 371 (c)(1),
(2) Date: Nov. 10, 2021

(87) PCT Pub. No.: WO2020/235476
PCT Pub. Date: Nov. 26, 2020

(65) Prior Publication Data
US 2022/0259063 A1 Aug. 18, 2022

(30) Foreign Application Priority Data

May 22, 2019 (JP) ................................ 2019-095849

(51) Int. Cl.
*C01G 25/02* (2006.01)
*B82Y 40/00* (2011.01)

(52) U.S. Cl.
CPC .............. *C01G 25/02* (2013.01); *B82Y 40/00* (2013.01); *C01P 2002/74* (2013.01); *C01P 2004/64* (2013.01)

(58) Field of Classification Search
None
See application file for complete search history.

(56) References Cited

U.S. PATENT DOCUMENTS

| | | | | |
|---|---|---|---|---|
| 8,124,230 B2 * | 2/2012 | Zimmerman | ........... | C01G 27/00 428/407 |
| 2008/0254718 A1 * | 10/2008 | Takakuma | ........... | C09K 3/1463 438/692 |
| 2009/0140284 A1 | 6/2009 | Kurino et al. | | |
| 2009/0308282 A1 * | 12/2009 | Koyama | ........... | B82Y 30/00 106/286.4 |
| 2010/0221556 A1 * | 9/2010 | Koyama | ........... | C01G 41/006 524/406 |
| 2012/0065312 A1 * | 3/2012 | Ishihara | ........... | B82Y 30/00 524/413 |
| 2012/0156141 A1 * | 6/2012 | Hay | ........... | B82Y 30/00 977/773 |
| 2012/0196206 A1 * | 8/2012 | Yamaguchi | ........... | H01M 4/8668 521/27 |
| 2016/0229751 A1 * | 8/2016 | Nishikawa | ........... | C01G 25/02 |
| 2017/0101538 A1 * | 4/2017 | Kubo | ........... | C09D 17/00 |
| 2017/0306161 A1 * | 10/2017 | Morita | ........... | C09C 1/00 |

FOREIGN PATENT DOCUMENTS

| | | |
|---|---|---|
| JP | 5-32416 | 2/1993 |
| JP | 11-245004 | 9/1999 |
| JP | 2006-240928 | 9/2006 |
| JP | 2008-44835 | 2/2008 |
| JP | 2013-91585 | 5/2013 |
| JP | 2014-80361 | 5/2014 |
| KR | 10-1302277 | 9/2013 |
| WO | 2015/005464 | 1/2015 |
| WO | 2016/158736 | 10/2016 |

OTHER PUBLICATIONS

Office Action issued Sep. 26, 2023 in Korean Patent Application No. 10-2021-7041416, with machine English translation.
Office Action issued Apr. 3, 2023, in Korean Application No. 10-2021-7041416, with machine English translation.
Office Action issued Nov. 15, 2022 in corresponding Japanese Patent Application No. 2021-520764, with machine English-language translation.
International Search Report issued Jul. 21, 2020 in International (PCT) Application No. PCT/JP2020/019433.
Office Action issued Jun. 14, 2022 in Japanese Patent Application No. 2021-520764, with English-language translation.
Application for Cancellation of Patent filed Aug. 13, 2024 in corresponding Korean Patent No. 10-2637981, and its English machine translation, pp. 1-40.
Palanisamy Manivasakan, et al., "Mass production $Al_2O_3$ and $ZrO_2$ nanoparticles by hot-air spray pyrolysis", Powder Technology, 2013, vol. 234, pp. 84-90.
Yanzhe Mao, et al., Supporting information for "Interface/defect-tunable macro and micro photoluminescence behaviours of Trivalent europium ions in electrospun $ZrO_2/ZnO$ porous nanobelts", Phys. Chem. Chem. Phys., 2017, vol. 19, pp. 9223-9231.

(Continued)

*Primary Examiner* — John J Figueroa
(74) *Attorney, Agent, or Firm* — WENDEROTH, LIND & PONACK, L.L.P.

(57) ABSTRACT

An object of the present invention is to provide zirconium oxide nanoparticles having large particle diameters. The present invention is zirconium oxide nanoparticles wherein a ratio CD90/D50) of a cumulative 90% particle diameter D90 by volume to a cumulative 50% particle diameter D50 by volume in particle diameter measurement by a dynamic light scattering method is not larger than 3.0, and a half width for a (101) plane in XHD measurement in which CuKα rays are used as a light source is not larger than 1.20°. The zirconium oxide nanoparticles preferably have a diffusion coefficient in particle diameter measurement by a dynamic light scattering method of not larger than $7.0 \times 10^{-7}$ $cm^2/sec$.

8 Claims, No Drawings

(56) References Cited

OTHER PUBLICATIONS

Ahmad Monshi, et al., "Modified Scherrer Equation to Estimate More Accurately Nano-Crystallite Size Using XRD", World Journal of Nano Science and Engineering, 2012, vol. 2, pp. 154-160.
Yanjie Zhang, et al., "Preparation of quantum dot-embedded polymeric nanoparticles using flash nanoprecipitation", RSC Advances, 2014, vol. 4, pp. 48399-48410.

\* cited by examiner

ZIRCONIUM OXIDE NANOPARTICLES, DISPERSION LIQUID AND RESIN COMPOSITION

TECHNICAL FIELD

The present invention relates to zirconium oxide nanoparticles, and a dispersion liquid and a resin composition containing the same.

BACKGROUND ART

In recent years, metal oxide nanoparticles have attracted much attention since the metal oxide nanoparticles make a contribution for allowing various materials such as optical materials, electronic component materials, magnetic recording materials, catalyst materials, and ultraviolet, absorbing materials to have a high function or exhibit high performance. For example, zirconium oxide particles have a high refractive index, and, therefore, a technique for enhancing a refractive index by dispersing zirconium oxide nanoparticles in resin is known.

For example. Patent Literature 1 discloses zirconium oxide nanoparticles which are coated with two or more kinds of coating materials, at least one of which is represented as $R^1$—COOH ($R^1$ represents a hydrocarbon group in which the number of carbon atoms is not less than 6).

CITATION LIST

Patent Literature

Patent literature 1:JP2008-44835A

SUMMARY OF THE INVENTION

Problems to be Solved by the Invention

In the technique for enhancing a refractive index of a particles-containing resin composition obtained by dispersing zirconium oxide nanoparticles in resin, increasing particle diameter of the zirconium oxide nanoparticles is considered to be effective for enhancing a refractive index of the resin composition. However, the particle diameter of the zirconium oxide nanoparticles disclosed specifically in Patent Literature 1 is about 5 nm.

Therefore, an object of the present invention is to provide zirconium oxide nanoparticles having large panicle diameters.

Solution to the Problems

The present invention is as follows.
[1] Zirconium oxide nanoparticles wherein
   a ratio (D90/D50) of a cumulative 90% particle diameter D90 by volume to a cumulative 50% particle diameter D50 by volume in particle diameter measurement by a dynamic light scattering method is not larger than 3.0, and
   a half width for a (101) plane in XRD measurement in which CuKα rays are used as a light source is not larger than 1.20°.
[2] The zirconium oxide nanoparticles according to [1], wherein a diffusion coefficient in particle diameter measurement by a dynamic light scattering method is not larger than $7.0 \times 10^{-7}$ cm$^2$/sec.
[3] The zirconium oxide nanoparticles according to [1]or [2], wherein the zirconium oxide nanoparticles are coated with a coating material.
[4] The zirconium oxide nanoparticles according to [3], wherein a refractive index of the zirconium oxide nanoparticles coated with the coating material is not less than 1.83.
[5] The zirconium oxide nanoparticles according to [3] or [4], wherein a weight reduction rate by heating of the zirconium oxide nanoparticles coated with the coating material is not larger than 15.0%.
[6] The zirconium oxide nanoparticles according to any one of [1] to [5], wherein a maximum particle diameter in particle diameter measurement by a dynamic light scattering method is not larger than 100 nm.
[7] A dispersion liquid comprising the zirconium oxide nanoparticles according to any one of [1] to [6].
[8] A resin composition comprising the zirconium oxide nanoparticles according to any one of [1] to [6].

Advantageous Effects of the Invention

The zirconium oxide nanoparticles of the present invention allow a resin composition to have a high refractive index.

DESCRIPTION OF EMBODIMENTS

In zirconium oxide nanoparticles of the present invention, a half width for a (101) plane in XRD measurement in which CuKα rays are used as a light source is not larger than 1.20°, and, furthermore, a ratio (D90/D50) of a cumulative 90% particle diameter D90by volume (hereinafter, may be simply referred to as D90) to a cumulative 50% particle diameter D50 by volume (hereinafter, may be simply referred to as D50) is not larger than 3.0 in particle diameter measurement by a dynamic light scattering method.

The (101) plane is a diffraction plane in a tetragonal crystal. The half width for the (101) plane of not larger than 1.20° means that a proportion of tetragonal crystals in which a crystallite diameter is large is high. As a result, a particle diameter of the zirconium oxide nanoparticles also becomes large. The half width for the (101) plane is preferably not larger than 1.1°and more preferably not larger than 1.0°. The half width for the (101) plane is preferably not less than 0.6°, more preferably not less than 0.65°, and even more preferably not less than 0.7°. In a case where the half width for the (101) plane is increased to be not less than a predetermined value, the crystallite diameter is not larger than a predetermined value, and the particle diameter of the zirconium oxide nanoparticles is not larger than a predetermined value, so that a resin composition containing the zirconium oxide nanoparticles can advantageously enhance transparency.

In the zirconium oxide nanoparticles of the present invention, the ratio (D90/D50) of the cumulative 90% particle diameter D90to the cumulative 50% particle diameter D50 is not larger than 3.0 in particle diameter measurement by a dynamic light scattering method. That is, the particle size distribution is sharp. In a case where the particle size distribution is sharp, when particles are dispersed in a membrane such as a film, the particles can be uniformly dispersed, so that a membrane such as a film which exhibits stable physical properties can be produced. The value of D90/D50 is preferably not larger than 2.5 and more preferably not larger than 2, and is preferably not less than 1.1 and more preferably not less than 1.2.

In the dynamic light scattering method, the particle diameter is measured based on a moving speed of the zirconium oxide nanoparticles in a solution. The solution is prepared by mixing mineral spirit solution of the zirconium oxide nanoparticles with hexane such that the concentration of the zirconium oxide nanoparticles is not less than 5 mass % and not larger than 10 mass %. The moving speed of the zirconium oxide nanoparticles in the solution correlates with a volume of the particles. Therefore, in this method, the particle diameter of the zirconium oxide nanoparticles can be estimated.

D50 measured in the dynamic light scattering method is, for example, not less than 13 nm, more preferably not less than 14 nm, and even more preferably not less than 15 nm. D50 is preferably not larger than 20 nm, more preferably not larger than 19 nm, and even more preferably not larger than 18 nm. Furthermore, the maximum particle diameter measured in the dynamic light scattering method is preferably not larger than 100 nm, more preferably not larger than 80 nm, and even more preferably not larger than 60 nm.

A diffusion coefficient measured in the dynamic light scattering method is preferably not larger than $7.0 \times 10^{-7}$ cm$^2$/sec. The diffusion coefficient in the above-described range means that the particle diameter of the zirconium oxide nanoparticles is large and can also be an index indicating that the particle size distribution is sharp. The diffusion coefficient is more preferably not larger than $6.5 \times 10^{-7}$ cm$^2$/sec and even more preferably not larger than $6.0 \times 10^{-7}$ cm$^2$/sec, and is preferably not less than $3.0 \times 10^{-7}$ cm$^2$/sec, more preferably not less than $3.5 \times 10^{-7}$ cm$^2$/sec, and even more preferably not less than $4.0 \times 10^{-7}$ cm$^2$/sec.

In the zirconium oxide nanoparticles of the present invention, a proportion of the tetragonal crystals can be calculated from a ratio of peak intensities derived from the crystal structures measured by X-ray diffraction, and a proportion of the peak intensity of the tetragonal crystals to the total of the peak intensities of the tetragonal crystals and monoclinic crystals is preferably not less than 80%, more preferably not less than 85%, and can be 100%.

A range of the X-ray diffraction measurement is not particularly limited. However, as the maximum diffraction peak of each of tetragonal crystals, cubic crystals, and monoclinic crystals which are the crystal structures of zirconium oxide, is detected in a range of 2 θ: 26 to 38°, the measurement is preferably performed in at least this range.

The zirconium oxide nanoparticles of the present invention are preferably coated with a coating material. Examples of the coating material include carboxylic acid compounds.

Examples of the carboxylic acid compounds include:
linear saturated aliphatic carboxylic acids such as oxalic acid, malonic acid, butyric acid, succinic acid, valeric acid, glutaric acid, hexanoic acid, adipic acid, heptanoic acid, octanoic acid, nonanoic acid, decanoic acid, dodecanoic acid, tetradecanoic acid, palmitic acid, and stearic acid;
branched saturated aliphatic carboxylic acids such as pivalic acid, 2,2-dimethylbutyric acid, 3,3-dimethylbutyric acid, 2,2-dimethylvaleric acid, 2,2-diethylbutyric acid, 3,3-diethylbutyric acid, 2-ethylhexanoic acid, 2-methylheptanoic acid, 4-methyloctanoic acid, and neodecanoic acid;
alicyclic-hydrocarbon-group-containing carboxylic acids such as naphthenic acid and cyclohexanedicarboxylic acid;
linear unsaturated aliphatic carboxylic acids such as acrylic acid, methacrylic acid, maleic acid, fumaric acid, oleic acid, linoleic acid, and linolenic acid;
ether-bond-containing carboxylic acids such as methoxyacetic acid, ethoxyacetic acid, 3-ethoxypropionate, 2-methoxyethoxy acetic acid, and 2-methoxyethoxyethoxy acetic acid;
hydroxy-group-containing carboxylic acids such as lactic acid, malic acid, citric acid, and hydroxystearic acid;
carbonyl-group-containing carboxylic acids such as pyruvic acid;
aromatic carboxylic acids such as benzoic acid, phthalic acid, and isophthalic acid;
and (meth)acryloyl group-containing carboxylic acids such as 2-acryloyloxyethyl succinate, 2-methacryloyloxyethyl succinate, 2-acryloyloxyethyl hexahydro phthalate, 2-methacryloyloxyethyl hexahydro phthalate, 2-acryloyloxyethyl phthalate, and 2-methacryloyloxyethyl phthalate.

The zirconium oxide nanoparticles of the present invention are preferably coated with at least a carboxylic acid compound (particularly, a monocarboxylic acid compound) in which the total number of carbon atoms is not less than 6 (preferably, not less than 7), and are more preferably coated with branched saturated aliphatic carboxylic acid (particularly, a monocarboxylic acid compound) in which the total number of carbon atoms is not less than 6 (preferably, not less than 7), among the carboxylic acid compounds.

The zirconium oxide nanoparticles of the present invention are preferably coated with two or more kinds of the carboxylic acid compounds, and are preferably coated with at least branched saturated aliphatic carboxylic acid in which the total number of carbon atoms is not less than 6 (preferably, not less than 7) and the ether-bond-containing carboxylic acid.

As the branched saturated aliphatic carboxylic acid, the branched saturated aliphatic carboxylic acid in which the total number of carbon atoms is not larger than 9 is preferable, the branched saturated aliphatic carboxylic acid in which the total number of carbon atoms is not larger than 8 is more preferable, and 2-ethylhexanoic acid is particularly preferable.

As the ether-bond-containing carboxylic acid, methoxyacetic acid, ethoxyacetic acid, 3-ethoxypropionate, 2-methoxyethoxy acetic acid, and 2-methoxyethoxyethoxy acetic acid are preferable, methoxyacetic acid and ethoxyacetic acid are more preferable, and methoxyacetic acid is even more preferable.

An amount of the coating material can be estimated by heating the coated zirconium oxide nanoparticles, measuring the weights before and after the heating, and calculating a reduced weight amount. That is, the coated zirconium oxide nanoparticles ere heated from room temperature to 800 ° C. at 10 ° C. /minute under an air atmosphere, the weights of the particles before and after the heating are measured, and the weight reduction rate 18 calculated according to the following equation.

Weight reduction rate by heating (%)={(weight of particles before heating)−(weight of particles after heating)}/(weight of particles before heating)×100

The weight reduction rate by heating is preferably not larger than 15.0% and more preferably not larger than 13%. The lower limit thereof is not limited, and the lower limit thereof is, for example, 8%.

In a case where the zirconium oxide nanoparticles of the present invention are coated with the coating material, a refractive index of the coated zirconium oxide nanoparticles is preferably not less than 1.83. The refractive index of the coated zirconium oxide nanoparticles is a value calculated in a method described below in Examples. The refractive index is more preferably not less than 1.84 and even more preferably not less than 1.85. The upper limit of the refractive index is not particularly limited, and the upper limit thereof is, for example, not larger than 2.2.

The procedure for calculating the refractive index of the coated zirconium oxide nanoparticles according to a preferable mode of the present invention is as follows. As described below in Examples, firstly, water, an alcohol-based solvent, or a hydrocarbon-based solvent is used as a dispersion medium, and a dispersion liquid is produced such that the concentration of the coated zirconium oxide nanoparticles is 58 to 82%. Subsequently, a type DR-M4 multi-wavelength Abbe refractometer (interference filter, wavelength of 589 (D) nm) manufactured by ATAGO CO., LTD. is used to measure a refractive index $n_d$ of the dispersion liquid and a refractive index $n_s$, of a solvent only and measure a specific gravity of the solvent and a specific gravity of the dispersion liquid. A volume ratio between the particles and the dispersion medium can be calculated from the specific gravity of the solvent, the specific gravity of the dispersion liquid, and a solid content. A refractive index $n_p$ of the coated zirconium oxide particles can be obtained from the measured $X_p$, $X_g$, and $n_d$ such that the calculated volume proportion $X_p$ (%) of the particles and volume proportion $X_g$, (%) of the dispersion medium (where $X_p + X_g = 100$), the measured refractive index $n_d$ of the dispersion liquid and refractive index $n_s$ of the solvent only, and the refractive index $n_p$ of the coated zirconium oxide particles satisfy the following relational expression.

$$n_p \times X_p/100 + n_g \times X_g/100 = n_d$$

The zirconium oxide nanoparticles of the present invention can be produced by heating a zirconium oxide precursor in the presence of water (hereinafter, referred to as hydrothermal synthesis). Preferably, the zirconium oxide precursor and the carboxylic acid compound are caused to react to generate zirconium to which carboxylate groups are bound, and the obtained product is subjected to the hydrothermal synthesis. Furthermore, in the present invention, preferably, a step (hereinafter, referred to as precursor-water reaction step (2)) of retaining the zirconium oxide precursor in the presence of water at a temperature of 50 to 100° C. (preferably 60 to 90° C., more preferably 85 to 90° C.) for 2 to 8 hours (preferably 3 to 6 hours) is performed before the zirconium oxide precursor and the carboxylic acid compound are mixed, and zirconium to which carboxylate groups are bound is generated (hereinafter, referred to as carboxylate-bound zirconium generation step (3)), by mixing and reacting the carboxylic acid compound and the zirconium oxide precursor having been subjected to the precursor-water reaction step (2).

In the precursor water reaction step (2), for water coexisting with the zirconium oxide precursor, water may be added separately from the zirconium oxide precursor or a water-containing zirconium oxide precursor may be used. While the zirconium oxide precursor is retained at 50 to 100° C. (preferably 60 to 90° C., more preferably 85 to 90° C.), the zirconium oxide precursor is preferably stirred. In step (2), preferably, a hydrocarbon-based solvent or the like further coexists.

In the carboxylate-bound zirconium generation step (3), the carboxylic acid compound and the zirconium oxide precursor having been subjected to step (2), and, preferably, a solvent (the solvent used in step (2) may be used as it is) are retained at a temperature of 100 to 150° C., preferably 100 to 140° C., and more preferably 100 to 130° C. for 2 to 6 hours, to generate carboxylate-bound zirconium. In step (3), an acid-base reaction or esterification occurs by heat treatment, and, in the zirconium oxide precursor, a part of groups (for example, —O —C(=O)—O— in the case of zirconium basic carbonate described below) bound to zirconium is replaced by a carboxylate group (—OCOR) to generate carboxylate-bound zirconium.

In step (3), a molar ratio of the carboxylic acid compound coexisting with the zirconium oxide precursor, relative to Zr in the zirconium oxide precursor, is preferably about 0.85 to 1.6 (preferably 1.05 to 1.5, more preferably 1.1 to 1.3). In step (3), water is generated as a reaction product of reaction between the zirconium oxide precursor and the carboxylic acid compound, and the water may remain in the system, or may be distilled out of the system. The water is more preferably distilled out of the system. By distilling the water out, a temperature for reaction between the zirconium oxide precursor and carboxylic acid is enhanced to promote the reaction, and, furthermore, transparency is advantageously enhanced when the zirconium oxide nanoparticles that are finally produced are dispersed in a solvent or a resin. In a case where the water is distilled out of the system in step (3), the maximum temperature for the reaction in step (3) is, for example, not lower than 120° C. (in general, not higher than 130° C.).

The zirconium oxide precursor is not particularly limited as long as the zirconium oxide precursor reacts with carboxylic acid to generate carboxylate-bound zirconium, and zirconium basic carbonate is preferably used. More preferably, zirconium basic carbonate containing water is used. An amount of the water contained in the zirconium basic carbonate is preferably 20 to 50 mass % of the total amount of the zirconium basic carbonate containing the water. Examples of the zirconium basic carbonate include zirconium basic carbonate manufactured by Nippon Light Metal Company, Ltd, zirconium carbonate (product name: S-ZBC, SN-ZBC) manufactured by Saint-Gobain ZirPro (Handan) Co., Ltd, zirconium basic carbonate manufactured by STREAM CHEMICALS, INC., and zirconium basic carbonate manufactured by ThermoFisher SCIENTIFIC. As the carboxylic acid compound, the branched saturated aliphatic carboxylic acid described above as the preferable carboxylic acid compound in which the total number of carbon atoms is not less than 6, is preferably used.

Preferably, a zirconium oxide precursor stirring step (1) of stirring the zirconium oxide precursor and a solvent at an ordinary temperature (20 to 40° C.) for 3 to 60 minutes (preferably 5 to 30 minutes) is further performed before the above-described precursor-water reaction step (2). In step (1), a small amount of a carboxylic acid compound is preferably mixed separately from the carboxylic acid compound used in the above-described step (3). An amount of the carboxylic acid compound may be, for example, 0.01 to 0.20 mols and preferably about 0.03 to 0.15 mols with respect to 1 mol of zirconium in the zirconium oxide precursor.

After the carboxylate-bound zirconium generation step (3), a purification step (4) of removing a water content, a byproduct, or an unreacted material remaining in the reaction liquid in step (3) through filtration or the like may be performed, and the concentration may be adjusted by, for example, adding a solvent such that a concentration of the zirconium is, for example, 10 to 15 mass %.

Water is added to the carboxylate-bound zirconium solution obtained in the carboxylate-bound zirconium generation step (3) or the purification step (4), and the hydrothermal synthesis is performed, whereby the zirconium oxide nanoparticles of the present invention (in particular, the zirconium oxide nanoparticles coated with the carboxylic acid compound) can be obtained. The conditions for the hydrothermal synthesis are not particularly limited, and a pressure for the hydrothermal synthesis may be, for example, not lower than 0.1 MPaG (representing a gauge pressure), preferably not lower than 0.2 MPaG, and more preferably not lower than 0.4 MPaG, and may be not higher than 1.5 MPaG. A temperature for the hydrothermal synthesis is, for example, not lower than 130° C., preferably not lower than 150° C., and more preferably not lower than 160° C., and is preferably not higher than 220° C. and more preferably not higher than 210° C. A time for the hydrothermal synthesis is, for example, 4 to 20 hours and preferably 6 to 10 hours. In the hydrothermal synthesis, the reaction may be performed at a constant temperature or the reaction may be performed in multiple steps such that the reaction is performed at a constant temperature, and the reaction temperature is thereafter increased. The reaction is preferably performed in two steps. In this case, the reaction temperature and the reaction time are preferably in the above-described ranges.

A ratio of a mol number of water to a mol number of zirconium in the hydrothermal synthesis is preferably not less than 3 and not larger than 50, and more preferably not less than 5 and not larger than 30.

Furthermore, the zirconium oxide nanoparticles obtained in the hydrothermal synthesis and a coating material (preferably, ether-bond-containing carboxylic acid) different from the carboxylic acid compound for coating in the hydrothermal synthesis are mixed with a solvent, and stirred at a temperature of 30 to 100° C. for 1 to 10 hours, whereby the zirconium oxide nanoparticles coated with two kinds of coating materials can be obtained. The solvent is not particularly limited as long as the solvent allows the zirconium oxide nanoparticles to be dispersed. Hydrothermal synthesis liquid containing the zirconium oxide nanoparticles may be used as it is, or an aromatic hydrocarbon based solvent such as toluene may be used.

The present invention also includes a dispersion liquid and a resin composition that include the above-described zirconium oxide nanoparticles of the present invention.

Examples of the solvent used for the dispersion liquid of the present invention include: alcohols such as methanol, ethanol, n-propanol, isopropanol, and ethylene glycol: ketones such as methyl ethyl ketone, methyl isobutyl ketone, and cyclohexanone: esters such as ethyl acetate, propyl acetate, and propyleneglycol monomethylether acetate: ethers such as ethylene glycol monomethyl ether and diethylene glycol monobutyl ether; modified ethers (preferably, ether-modified and/or ester-modified ethers, and more preferably ether-modified and/or ester-modified alkylene glycols) such as propyleneglycol monomethylether acetate: hydrocarbons such as benzene, toluene, xylene, ethylbenzene, trimethylbenzene, hexane, cyclohexane, methylcyclohexane, ethylcyclohexane, and mineral spirit; halogenated hydrocarbons such as dichloromethane and chloroform; amides such as dimethylformamide, N,N-dimethylacetamide, and N-methylpyrrolidone; water; and oils such as mineral oil, vegetable oil, wax oil, and silicone oil. One of them may be selected and used, or two or more of them can be selected and used in a mixed manner.

In the dispersion liquid of the present invention, a polymerizable compound such as a monofunctional monomer and a crosslinkable monomer may be used as a medium.

The monofunctional monomer may be a compound having one polymerizable carbon-carbon double bond. Examples of the monofunctional monomer include (meth) acrylic ester; styrene-based monomers such as styrene, p-tert-butylstyrene, α-methylstyrene, m-methylstyrene, p-methylstyrene, p-chlorostyrene, and p-chloromethylstyrene; carboxyl-group-containing monomers such as (meth) acrylic acid: and hydroxy-group-containing monomers such as hydroxyethyl (meth)acrylate. Specific examples of the (meth)acrylic ester include alkyl (meth)acrylates such as methyl (meth)acrylate, ethyl (meth)acrylate, n-propyl (meth)acrylate, n-butyl (meth)acrylate, isobutyl (meth)acrylate, tertbutyl (meth)acrylate, 2-ethylhexyl (meth)acrylate, and lauryl (meth)acrylate; cycloalkyl (meth)acrylates such as cyclohexyl (meth)acrylate and isobornyl (meth)acrylate: (meth)acrylic acid aralkyl such as benzyl (meth)acrylate; and glycidyl-group-containing (meth)acrylic esters such as glycidyl (meth)acrylate. Methyl (meth)acrylate is particularly preferable. One of the monofunctional monomers described as examples may be used alone or two or more kinds of the monofunctional monomers may be used in a mixed manner as appropriate.

The crosslinkable monomer may be a compound that contains a plurality of carbon-carbon double bonds that can be copolymerized with carbon-carbon double bonds of a monofunctional monomer. Specific examples of the crosslinkable monomer include: alkylene glycol poly(meth)acrylates such as ethylene glycol di(meth)acrylate, diethylene glycol di(meth)acrylate, propylene glycol di(meth)acrylate, and dipropylene glycol di(meth)acrylate; neopentylglycol poly(meth)acrylates such as neopentylglycol di(meth)acrylate and dineopentylglycol di(meth)acrylate; trimethylolpropane poly(meth)acrylates such as trimethylolpropane tri (meth)acrylate and ditrimethylolpropane tetra(meth) acrylate; multifunctional (meth)acrylates such as pentaerythritol poly(meth)acrylate like pentaerythritol tetra (meth)acrylate and dipentaerythritol hexa(meth)acrylate; multifunctional styrene-based monomers such as divinylbenzene; and multifunctional allyl-ester-based monomers such as diallyl phthalate, diallyl isophthalate, triallylcyanurate, and triallyl isocyanurate.

Resin used for the resin composition is not particularly limited as long as the resin is normally used resin. Examples of the resin include thermoplastic resin, thermosetting resin, and photocurable resin.

Specific examples of the thermoplastic resin include polyamides such as 6-nylon, 66-nylon, and 12-nylon; polyimides; polyurethanes; polyolefins such as polyethylene and polypropylene; polyesters such as PET, PBT, and PEN; aromatic polyethers such as polyether sulfone, polyether ether sulfone, polyether ketone, and polyether ether ketone; polyvinyl chlorides; polyvinylidene chlorides; polyvinyl acetates; polystyrenes; (meth)acrylic-resin-based polymers; ABS resin; fluororesin; and imidosilane resin. Examples thereof also include soft resins and hard resins such as polyvinyl butyral-based resins, polyurethane-based resins, ethylene-vinyl acetate copolymer-based resins, and ethylene-(meth)serylic ester copolymer-based resins. In a case where the thermoplastic resin is used as a medium, known mixing means can be used, and, for example, mixing with an extruder or mixing with a solution can be preferably adopted.

Examples of the thermosetting resin include, as condensation-type thermosetting resin, phenol resins such as phenol-formalin resin and cresol-formalin resin, and amino resins such as urea resin, melamine resin, and guanamine resin. In a case where phenol-based resin is adopted, a compound having a triazine-ring, a guanamine derivative, a cyanuric acid derivative, or an isocyanuric acid derivative may be used in combination in a preferable embodiment.

As resin which is curable with heat or light, resin having a cationically polymerizable group and/or radically polymerizable group can be used. Specific examples of the resin include: epoxy resin; urethane (meth)acrylate; epoxy (meth) acrylate; polyester (meth)acrylate; unsaturated polyester;

styrene-based resins such as divinylbenzene; allyl ester-based resins such as diallyl phthalatc, diallyl isophthalate, triallyl cyanurate, and triallyl isocyanurate; (meth)acrylic acid-based derivatives including bifunctional (meth)acrylate compounds such as ethylene glycol di(meth)acrylate, 1,6-hexane diol di(meth)acrylate, 1,9-nonane diol di(meth)acrylate, neopentylglycol di(meth)acrylate, 3-methyl-1,5-pentane diol di(meth)acrylate, 2-butyl-2-ethyl-1,3-propane diol di(meth)acrylate, dimethylol-tricyclodecane di(meth)acrylate, pentacyclopentadocane dimethanol di(meth)acrylate, a di(meth)acrylic acid adduct of bisphenol A diglycidyl ether, cyclohexanedimethanol di(meth)acrylate, norbomane dimethanol di(meth)acrylate, p-menthane-1,8-diol di(meth)acrylate, p-menthane-2,8-diol di(meth)acrylate, p-menthane-3,8-diol di(meth)acrylate, and bicyclo-2[2.2.2 ]-octane-1-methyl-4-isopropyl-5,6-dimethylol di(meth)acrylate, and tri- or higher functional (meth)arrylnte compounds such as trimethylolpropane tri(meth)acrylate, trimethylolethane tri(meth)acrylate, glycerin tri(meth)acrylate, pentaerythritol tetra(meth)acrylate, dipentaerythritol hexa(meth)acrylate, tripentaerythritol poly(meth)acrylate, tetrapentaerythritol poly(meth)acrylate, and pentapentaerythritol poly(meth)acrylate; (meth)acrylic derivatives, having an ether structure, such as (meth)acrylic acid 2-vinyloxyethyl, (meth)acrylic acid 2-(2-vinyloxyethoxy)ethyl, diethylene glycol di(meth)acrylate, triethylene glycol di(meth)acrylate, tetraethylene glycol di(meth)acrylate, tri(meth)acrylate of ethylene oxide adduct of trimethylolpropane, and di(meth)acrylate of ethylene oxide adduct of bisphenol A; vinyl-ether-based compounds such as triethylene glycol divinyl ether and cyclohexanedimethanol divinyl ether; allyl-ether-based compounds such as allyl ethers like trimethylolpropane diallyl ether and pentaerythritol triallyl ether, and adipate of glycerin diallyl ether; polymers containing side-chain double bonds; and isocyanurate compounds having polymerizable functional groups and silicon-containing groups.

Among them, polyimides, polyurethanes, polyesters, (meth)acrylic resin-based polymers, phenol resin, amino resin, and epoxy resin are more preferable. One of them may be used alone or two or more of them may be used in a mixed manner.

The resin composition of the present invention also includes a composition of the zirconium oxide nanoparticles of the present invention and monomers (polymer precursor) constituting the above-described polymer, such as a mixture of dicarboxylic acid and diamine, and unsaturated carboxylic acid like acrylic acid and methacrylic acid and ester compounds thereof. The resin composition of the present invention may include both a polymer and a monomer.

A dispersion containing the zirconium oxide nanoparticles of the present invention can exhibit advantageous dispersibility and storage stability. Therefore, the dispersion can be applied to various usages typified by products and the like formed or cured by using the dispersion. Examples of usage that requires high dispersibility include usage for resist, usage in an optical field, usage for coating, and usage for adhesion. The dispersion is preferably used for optical lenses, tackifiers for optical films; adhesives for optical films; resin compositions for nanoimprint; micro lens arrays; protective films such as antireflection layers, antireflection films and antireflection agents used for transparent electrodes, surface coat of optical lens, organic EL light extraction layers, various hard coat materials, planarization films for TFT, overcoat and antireflection films for color filter; optical materials such as optical filters, insulating films for touch sensor, insulating films for TFT, photospacers for color filter, and protective films for touch panel. Particularly, the zirconium oxide nanoparticles of the present invention have high refractive index, high hardness, and high stability in addition to prominent dispersibility. Therefore, the zirconium oxide nanoparticles of the present invention are preferably used for optical lenses, surface coat of optical lens, various hard coat materials, insulating films for touch sensor, insulating films for TFT, and touch panel protective films.

Furthermore, the zirconium oxide nanoparticles of the present invention can be applied to semiconductor gate insulating films, and capacitor insulating films for memory such as DRAM in addition to the usage in the optical field since the zirconium oxide nanoparticles have the high dielectric constant. As a method for obtaining an insulating film having the high dielectric constant, a method in which an organic metal precursor is deposited by using s vapor phase growth method such as CVD (Chemical Vapor Deposition) or ALD (Atomic Layer Deposition), and thereafter oxidized is known. In order to obtain metal oxide having the high dielectric constant as desired, high temperature treatment at 600° C. or higher is required. However, a phenomenon, such as pinning phenomenon, in which operation of a semiconductor layer becomes unstable is caused due to the influence of the high temperature treatment. No high temperature treatment is required for the zirconium oxide nanoparticles of the present invention, and the zirconium oxide nanoparticles already have a high dielectric constant when generated, and allow lamination that can address semiconductor microfabrication and can also be applied to producing of semiconductors on plastic substrates since no high temperature treatment is required. Examples of the other usages of the zirconium oxide nanoparticles of the present invention include usages for dental materials such as dentures, mechanical-pencil lead, and wood-pencil lead.

This application claims priority to Japanese Patent Application No. 2019-095849 filed on May 22, 2019. The entire contents of the specification of Japanese Patent Application No. 2019-095849 filed on May 22, 2019 are incorporated herein by reference.

EXAMPLES

The present invention will be described below in more detail by means of examples. The present invention is not limited by the following examples, and can also be carried out with appropriate modifications being made within the range of the gist described above and below, and any of these modifications are included in the technical scope of the present invention.

The zirconium oxide nanoparticles obtained in examples and comparative examples described below were evaluated in the following methods.

(1) Measurement of Particle Diameter and Diffusion Coefficient in Dynamic Light Scattering Method The particle diameter and the diffusion coefficient according to the dynamic light scattering method were measured by using a measurement device (manufactured by Otsuka Electronics Co., Ltd., concentrated system particle size analyzer FPAR-1000). A product obtained by adding 0.7 to 1.0 g of hexane to 0.6 g of mineral spirit solution of the zirconium oxide nanoparticles which was filtered through 5 B filter paper (such that the concentration of the zirconium oxide nanoparticles was about 5 to 10 mass %) was used as a measurement sample, and the measurement was performed three times at a measurement temperature of 25° C. for a measurement time of 180 seconds, and an average value of D50 obtained from volume distributions was set as an average particle diameter. D90, the maximum particle diameter, and the diffusion coefficient were each measured three times, to obtain each average value. In a case where the mineral spirit solution of the zirconium oxide particles became clouded when prepared, one kind of carboxylic acid selected from the group consisting of ((2-methoxyethoxy) ethoxy)acetic acid, hydroxy stearic acid, and stearic acid was added to Zr by 5 weight % or less as such a minimum value as to allow the solution to become transparent, in order to obtain a transparent solution.

(2) Analysis of Crystal Structure by Powder X-Ray Diffraction

The crystal structure of the zirconium oxide nanoparticles was measured by using a full automatic multi-purpose X-ray diffractometer (SmartLah available from Rigaku Corporation). The measurement. conditions were as follows.

X-ray source: CuKα (0.154 nm)
X-ray output setting: 45 kV, 200 mA
Step size: 0.02°
Scan speed: 5°/min
Measurement range: 5 to 90°
Measurement temperature: 25 ° C.

The obtained X-ray diffraction chart was analyzed by analysis software (PDXL2), and an FWHM (Full Width at Half Maximum) of analysis values for the (101) plane was obtained and set as a half width for the (101) plane.

(3) Measurement of Weight Reduction Rate by Heating

A weight reduction rate by heating was measured by using TG-DTA2000SR (with an autosampler) manufactured by BRUKER axs. The zirconium oxide nanoparticles were heated from room temperature to 800° C. at 10° C./minute under an air atmosphere, and the weights of the particles before and after the heating were measured, to measure a weight reduction rate of the particles according to the following equation.

Weight reduction rate by heating(%)={(weight of particles before heating)−(weight of particles after heating) }/(weight of particles before heating)×100

(4) Refractive Index of Zirconium Oxide Nanoparticles

ISOPAR G (manufactured by ANDOH PARACHEMIE CO., LTD.) was added as a dispersion medium to the zirconium oxide nanoparticles dried after the hydrothermal synthesis, and the obtained product was heated and stirred to produce a dispersion liquid of the zirconium oxide nanoparticles such that the concentration of the zirconium oxide nanoparticles was 58 to 82%. A type DR-M4 multi-wavelength Abbe refractometer (interference filter, wavelength of 589 (D) nm) manufactured by ATAGO CO., LTD. was used to measure a refractive index of the dispersion liquid. Furthermore, a specific gravity of the dispersion liquid and a content of a solid content were measured. The content of the solid content was set as a weight ratio between the particles and the dispersion medium, and a volume ratio between the particles and the dispersion medium was calculated from the specific gravities of the solvent and the dispersion liquid. The refractive index of the particles was calculated from the volume ratio and the refractive indexes of the solvent and the dispersion liquid.

Water and/or methanol were added as a dispersion medium to the zirconium oxide nanoparticles dried after surface treatment, and the obtained product was heated and stirred to produce a dispersion liquid of the zirconium oxide nanoparticles such that the concentration of the zirconium oxide nanoparticles was 58 to 82%. A type DR-M4 multi-wavelength Abbe refractometer (interference filter, wavelength of 589 (D) nm) manufactured by ATAGO CO., LTD. was used to measure a refractive index of the dispersion liquid. Furthermore, a specific gravity of the dispersion liquid and a content of a solid content were measured. The content of the solid content was set as a weight ratio between the particles and the dispersion medium, and a volume ratio between the particles and the dispersion medium was calculated from the specific gravities of the solvent and the dispersion liquid. The refractive index of the surface-treated particles was also calculated from the volume ratio and the refractive indexes of the solvent and the dispersion liquid.

Example 1

Production of Zirconium 2-Ethylhexanoate

In a 200 ml separable flask having a stirrer, a thermometer, and a cooling tube, 50 g of zirconium basic carbonate (ZRC manufactured by Nippon Light Metal Company, Ltd., $ZrO_2$ content of 42.3%, water content of 37%), and 73.5 g of mineral spirit as a solvent and 2.5 g of 2-ethylhexanoic acid, were put, and stirred at an ordinary temperature for 5 to 10 minutes (step (1)), and the obtained product was thereafter immersed in an oil bath, and the internal temperature was increased to 70° C. while the product was being stirred at 400 rpm. Thereafter, the internal temperature was maintained at 70° C. to 80° C., and the product was continued to be stirred for three hours (step (2)). Thereafter, 23.8 g of 2-ethylhexanoic acid was added (the sum of 23.8 g of 2-ethylhexanoic acid and 2.5 g of 2-ethylhexanoic acid added in step (1) was 1.1 mol with respect to Zr), and the obtained product was retained for four hours while the temperature in the oil bath was adjusted such that the internal temperature was 100 to 103° C., to react the zirconium basic carbonate with 2-ethylhexanoic acid (step (3)).

The reaction product was like a white slurry at the start of the reaction, but was a translucent cloudy liquid at the end of the reaction. The reaction liquid was cooled to room temperature, so that the reaction liquid was separated into two layers, and the upper layer was a mineral spirit layer. The upper layer was filtered, and a small amount of mineral spirit was added to adjust the Zr concentration to about 12% (step (4)), and the hydrothermal synthesis described below was thereafter performed by using the obtained liquid.

Hydrothermal Synthesis

In 42.4 g of the obtained mineral spirit solution of zirconium 2-ethylhexanoate, 7.3 g of pure water was mixed, and the obtained product was put in an autoclave (capacity of 100 ml) having a thermometer and a stirrer, and an atmosphere in a reactor was substituted with nitrogen gas. Thereafter, heating was performed such that the internal temperature became and reaction was performed for nine hours, to synthesize zirconium oxide nanoparticles. The pressure in the container was 1.2 MPa when the reaction was performed at 190° C. After the reaction, the solution was taken out, and the generated precipitate was filtered out, and the resultant product was washed with acetone, and thereafter dried under a reduced pressure, to obtain zirconium oxide nanoparticles (zirconium oxide nanoparticles coated with 2-ethylhexanoic acid).

A crystal structure of the zirconium oxide nanoparticles was confirmed by using an X-ray diffractometer. As a result, diffraction lines attributed to a tetragonal crystal structure and a monoclinic crystal structure were detected. According to the intensities of the diffraction lines, it was confirmed that the crystal structure was mainly formed by the tetragonal crystals, and a ratio in peak intensity between the tetragonal crystal and the monoclinic crystal, which was estimated from diffraction peaks, was 91/9. The particle diameter and the diffusion coefficient measured according to "(1) Measurement of particle diameter and diffusion coefficient in dynamic light scattering method" described above, the half width for the (101) plane measured according to "(2) Analysis of crystal structure by powder X-ray diffraction" described above, and the measurement results of "(3) Measurement of weight reduction rate by heating" described above and "(4) Refractive index of zirconium oxide nanoparticles" described above are indicated in Table 1.

Surface Treatment Of Zirconium Oxide Nanoparticles

In a 200 ml separable flask having a stirrer, a thermometer, and a cooling tube, 9.4 g of the zirconium oxide nanoparticles coated with 2-ethylhexanoic acid, which was obtained in the above-described hydrothermal synthesis, and 41 g of mineral spirit solvent were put, and 0.2 g of stearic acid and 1.2 g of methoxyacetic acid were added, and the obtained product was retained at 50° C. for one hour, to surface-modify the surfaces of the zirconium oxide nanoparticles with methoxyacetic acid. For the zirconium oxide nanoparticles having been subjected to the surface treatment with methoxyacetic acid, the weight reduction rate by heating and the refractive index of the zirconium oxide nanoparticles were calculated in the above-described methods according to "(3) Measurement of weight reduction rate by heating " and "(4) Refractive index of zirconium oxide nanoparticles" described above.

Example 2 to Example 4

Zirconium oxide nanoparticles coated with 2-ethylhexanoic acid and methoxyacetic acid were produced in the same manner as in Example 1 except that the stirring temperature after a mixture of zirconium basic carbonate, mineral spirit, and 2-ethylhexanoic acid was immersed in an oil bath and the temperature was increased, a retaining time at the stirring temperature, a molar ratio of 2-ethylhexanoic acid added after the stirring, with respect to Zr, and a temperature for reaction between 2-ethylhexanoic acid and the zirconium basic carbonate, were changed to the values indicated in Table 1. In the examples in which the reaction temperature in step (3) was indicated as 100 to 130° C., water as a reaction product in step (3) was distilled out.

Example 5

In a 200 ml separable flask having a stirrer, a thermometer, and a cooling tube, 50 g of zirconium basic carbonate (SZBC manufactured by Saint-Gobain ZirPro (Handan) Co., Ltd., $ZrO_2$ content of 41.1%, water content of 40.2%), and 74 g of mineral spirit as a solvent and 2.5 g of 2-ethylhexanoic acid were put, and stirred at an ordinary temperature for 5 to 10 minutes (step (1)). and the obtained product was thereafter immersed in an oil bath, and the internal temperature was increased to 85° C. while the product was being stirred 250 rpm. Thereafter, the internal temperature was maintained at 85° C. to 90° C., and the product was continued to be stirred for three hours (step (2)). Thereafter, 24 g of 2-ethylhexanoic acid was added (the sum of 24 g of 2-ethylhexanoic acid and 2.5 g of 2 ethylhexanoic acid added in step (1) was 1.1 mol with respect to Zr), and the obtained product was retained for four hours while the temperature in the oil bath was adjusted such that the internal temperature was 100 to 130 ° C., to react the zirconium basic carbonate with 2-ethylhexanoic acid (step (3)).

The reaction product was like a white slurry at the start of the reaction, but was a translucent cloudy liquid at the end of the reaction. The reaction liquid was cooled to room temperature, so that the reaction liquid was separated into two layers, and the upper layer was a mineral spirit layer. The upper layer was filtered, and a small amount of mineral spirit was added to adjust the Zr concentration to about 12% (step (4)), and the hydrothermal synthesis and the surface treatment same as those in Example 1 were performed by using the obtained liquid.

Example 6

Using zirconium 2-ethylhexanoate produced through step (1) to step (4) same as those in Example 5, the hydrothermal synthesis was performed in the following method.

Hydrothermal Synthesis

In 42.4 g of mineral spirit solution of zirconium 2-ethylhexanoate obtained in the same method as in Example 5, 7.3 g of pure water was mixed and the obtained product was put in an autoclave (capacity of 100 ml) having a thermometer and a stirrer, and an atmosphere in a reactor was substituted with nitrogen gas. Thereafter, heating was performed such that the internal temperature became 190° C. and reaction was performed for nine hours, and the internal temperature was thereafter increased to 195° C. and reaction was performed for eight hours, to synthesize the zirconium oxide nanoparticles. The pressure in the container was 1.2 MPa when the reaction was performed at 190° C., and the pressure in the container was 1.40 MPa when the reaction was performed at 195° C. After the reaction, the solution was taken out, and the generated precipitate was filtered out, and the resultant product was washed with acetone, and thereafter dried under a reduced pressure, to obtain zirconium oxide nanoparticles (zirconium oxide nanoparticles coated with 2-ethylhexanoic acid).

A crystal structure of the zirconium oxide nanoparticles was confirmed by using an X-ray diffractometer. As a result, diffraction lines attributed to a tetragonal crystal structure and a monoclinic crystal structure were detected. According to the intensities of the diffraction lines, it was confirmed that the crystal structure was mainly formed by the tetragonal crystals, and a ratio in peak intensity between the tetragonal crystal and the monoclinic crystal, which was estimated from diffraction peaks, was 92/8. The particle diameter and the diffusion coefficient measured according to "(1) Measurement of particle diameter and diffusion coefficient in dynamic light scattering method " described above, the half width for the (101) plane measured according to "(2) Analysis of crystal structure by powder X-ray diffraction " described above, and the measurement results of "(3) Measurement of weight reduction rate by heating " and "(4) Refractive index of zirconium oxide nanoparticles" described above are indicated in Table 1.

Surface Treatment Of Zirconium Oxide Nanoparticles

In a 200 ml separable flask having a stirrer, a thermometer, and a cooling tube, 9.4 g of the zirconium oxide nanoparticles coated with 2-ethylhexanoic acid, which was obtained in the above-described hydrothermal synthesis, and 41 g of mineral spirit solvent were put, and 0.2 g of stearic acid and 1.2 g of methoxyacetic acid were added, and the obtained product was retained at 50° C. for one hour, to further surface-modify the surfaces of the zirconium oxide nanoparticles with methoxyacetic acid. For the zirconium oxide nanoparticles having been subjected to the surface treatment with methoxyacetic acid, the weight reduction rate by heating and the refractive index of the zirconium oxide nanoparticles were calculated in the above-described methods according to "(3) Measurement of weight reduction rate by heating" and "(4) Refractive index of zirconium oxide nanoparticles" described above.

Comparative Example 1

In a 200 ml separable flask having a stirrer, a thermometer, and a cooling tube, 50 g of zirconium basic carbonate (ZBC manufactured by Nippon Light Metal Company, Ltd., $ZrO_2$ content of 42.3%, water content of 37%), 73.5 g of mineral spirit as a solvent and 32.1 g of 2-ethylhexanoic acid (1.3 mol with respect to Zr) were put, and the obtained product was immersed in an oil bath and retained for four hours while the temperature in the oil bath was adjusted such that the internal temperature was 100 to 103 °C., to react the zirconium basic carbonate with 2-ethylhexanoic acid.

Thereafter, the obtained mineral spirit solution of zirconium 2-ethylhexanoate was subjected to the hydrothermal synthesis in the same manner as in Example 1, and the surface treatment with methoxyacetic acid was performed in the same manner as in Example 1, to produce zirconium oxide nanoparticles coated with 2-ethylhexanoic acid and methoxyacetic acid.

Comparative Example 2

The zirconium oxide nanoparticles coated with 2-ethylhexanoic acid and methoxyacetic acid were produced in the same manner as in Comparative example 1 except that the temperature at which zirconium basic carbonate reacted with 2-ethylhexanoic acid was 100 to 130° C.

TABLE 1

| | Producing conditions | | | | | Properties of particles | |
|---|---|---|---|---|---|---|---|
| | Step(2) | | | Step(3) | | Half width | |
| | Staring temperature of starting material after heating [° C.] | Maintaining time at temperature of the left column [hr] | Molar ratio of 2-ethythexanoic acid to Zr | Reaction temperature [° C.] | Reaction time [hr] | for (101) plane [*] | D90/D50 |
| Exapmle 1 | 70-80 | 3 | 1.1 | 100-103 | 4 | 0.89 | 1.5 |
| Exapmle 2 | 70-80 | 6 | 1.1 | 100-103 | 4 | 0.92 | 1.4 |
| Exapmle 3 | 85-90 | 3 | 1.3 | 100-103 | 4 | 0.81 | 1.4 |
| Exapmle 4 | 85-90 | 3 | 1.1 | 100-130 | 4 | 0.79 | 1.3 |
| Exapmle 5 | 85-90 | 3 | 1.1 | 100-130 | 4 | 0.87 | 1.3 |
| Exapmle 6 | 85-90 | 3 | 1.1 | 100-130 | 4 | 0.78 | 1.3 |
| Comparative example 1 | — | — | 1.3 | 100-103 | 4 | 1.28 | 1.5 |
| Comparative example 2 | — | — | 1.3 | 100-130 | 4 | 1.22 | 1.5 |

| | Properties of particles | | | | | | |
|---|---|---|---|---|---|---|---|
| | Particle diameter D50 [nm] | Maximum particle diameter [nm] | Diffusion coefficient [×$10^{-7}cm^2/s$] | Weight reduction rate by heating after coating 2-ethythexanoic acid [%] | Refractive index of particles (after coating 2-ethythexanoic acid) | Weight reduction rate by heating after costing after coating methoxyacetic acid [%] | Refractive index of particles (after coating methoxyacetic acid) |
| Exapmle 1 | 17.8 | 0 | 5.327 | 13.30 | 1.833 | 13.12 | 1.855 |
| Exapmle 2 | 17.4 | 30 | 5.933 | 12.90 | 1.844 | 11.79 | 1.880 |
| Exapmle 3 | 19.0 | 39 | 5.085 | 12.06 | 1.880 | 10.92 | 1.896 |
| Exapmle 4 | 20.0 | 40 | 4.943 | 12.93 | 1.844 | 11.46 | 1.883 |
| Exapmle 5 | 19.0 | 32 | 5.475 | 12.29 | 1.853 | 11.15 | 1.886 |
| Exapmle 6 | 19.3 | 40 | 4.968 | 11.63 | 1.861 | 10.45 | 1.901 |
| Comparative example 1 | 12.2 | 26 | 7.321 | 16.65 | 1.766 | 15.70 | 1.784 |
| Comparative example 2 | 12.5 | 23 | 7.901 | 16.43 | 1.771 | 15.31 | 1.792 |

INDUSTRIAL APPLICABILITY

The zirconium oxide nanoparticles of the present invention can be preferably used for sealants for semiconductor laser, optical sheets for liquid crystal display device substrates, organic EL display device substrates, color filter substrates, touch panel substrates, solar battery substrates, and the like, transparent plates, optical lenses, optical elements, optical waveguides, dental materials, mechanical-pencil lead, wood-pencil lead, and the like.

The invention claimed is:

1. Zirconium oxide nanoparticles wherein
a ratio (D90/D50) of a cumulative 90% particle diameter D90 by volume to a cumulative 50% particle diameter D50 by volume in particle diameter measurement by a dynamic light scattering method is not larger than 3.0, and
a half width for a (101) plane in XRD measurement in which CuKα rays are used as a light source is not larger than 1.20°.

2. The zirconium oxide nanoparticles according to claim 1, wherein a diffusion coefficient in particle diameter measurement by a dynamic light scattering method is not larger than $7.0 \times 10^{-7}$ cm$^2$/sec.

3. The zirconium oxide nanoparticles according to claim 1, wherein the zirconium oxide nanoparticles are coated with a coating material.

4. The zirconium oxide nanoparticles according to claim 3, wherein a refractive index of the zirconium oxide nanoparticles coated with the coating material is not less than 1.83.

5. The zirconium oxide nanoparticles according to claim 3, wherein a weight reduction rate by heating of the zirconium oxide nanoparticles coated with the coating material is not larger than 15.0%.

6. The zirconium oxide nanoparticles according to claim 1, wherein a maximum particle diameter in particle diameter measurement by a dynamic light scattering method is not larger than 100 nm.

7. A dispersion liquid comprising the zirconium oxide nanoparticles according to claim 1.

8. A resin composition prepared using the zirconium oxide nanoparticles according to claim 1.

* * * * *